(12) United States Patent
Takahashi

(10) Patent No.: US 10,377,487 B2
(45) Date of Patent: Aug. 13, 2019

(54) DISPLAY DEVICE AND DISPLAY CONTROL METHOD

(71) Applicant: Brother Kogyo Kabushiki Kaisha, Nagoya-shi, Aichi-ken (JP)

(72) Inventor: Hiromasa Takahashi, Gamagori (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 82 days.

(21) Appl. No.: 15/851,826

(22) Filed: Dec. 22, 2017

(65) Prior Publication Data

US 2018/0120900 A1    May 3, 2018

Related U.S. Application Data

(63) Continuation of application No. PCT/JP2017/010635, filed on Mar. 16, 2017.

(30) Foreign Application Priority Data

Mar. 29, 2016 (JP) ................................. 2016-064824

(51) Int. Cl.
*B64C 39/02* (2006.01)
*G02B 27/01* (2006.01)
(Continued)

(52) U.S. Cl.
CPC .......... *B64C 39/024* (2013.01); *G02B 27/017* (2013.01); *H04N 5/23293* (2013.01);
(Continued)

(58) Field of Classification Search
CPC .............. B64C 39/024; H04N 5/23296; H04N 5/23293; H04N 5/64; H04N 7/185; G02B 27/017; G02B 2027/0138; G05D 1/0016
See application file for complete search history.

(56) References Cited

U.S. PATENT DOCUMENTS 5,905,525 A    5/1999  Ishibashi et al.
8,903,568 B1   12/2014  Wang et al.
(Continued)

FOREIGN PATENT DOCUMENTS

JP    H09-037137 A    2/1997
JP    2000-333161 A   11/2000
(Continued)

OTHER PUBLICATIONS

Oct. 2, 2018—(WO) International Preliminary Report on Patentability—App PCT/JP2017/010635, Eng Tran.
(Continued)

*Primary Examiner* — Liliana Cerullo
(74) *Attorney, Agent, or Firm* — Banner & Witcoff, Ltd.

(57) ABSTRACT

A display device, configured to display an image photographed by a camera mounted on a remotely controlled mobile object, includes a display part which is mountable on a head of a user and capable of displaying an image, a receiving part configured to receive a photographed image and position information of the mobile object transmitted from the mobile object, a position detection part configured to detect a position of the display part, a direction detection part configured to detect a direction of the display part, and a controller configured to control image displaying on the display part, determine whether the mobile object exists in the direction of the display part and within a particular range with respect to a position of the display part, and switch images to be displayed on the display part depending on whether the mobile object exists within the particular range or not.

16 Claims, 4 Drawing Sheets

(51) Int. Cl.
  *H04N 5/232* (2006.01)
  *H04N 7/18* (2006.01)
  *H04N 5/64* (2006.01)

(52) U.S. Cl.
  CPC ......... *H04N 5/23296* (2013.01); *H04N 7/185* (2013.01); *B64C 2201/127* (2013.01); *B64C 2201/146* (2013.01); *G02B 2027/0138* (2013.01); *H04N 5/64* (2013.01)

(56) References Cited

U.S. PATENT DOCUMENTS

| | | | |
|---|---|---|---|
| 9,158,305 | B2 | 10/2015 | Ohtomo et al. |
| 2013/0038692 | A1 | 2/2013 | Ohtomo et al. |
| 2015/0293362 | A1 | 10/2015 | Takahashi et al. |
| 2016/0159280 | A1* | 6/2016 | Takazawa ............ B60K 35/00 345/8 |
| 2018/0025649 | A1* | 1/2018 | Contreras ............ G05D 1/0033 701/3 |
| 2018/0249086 | A1* | 8/2018 | Ozawa ................ H04N 13/239 |

FOREIGN PATENT DOCUMENTS

| | | |
|---|---|---|
| JP | 2009-278234 A | 11/2009 |
| JP | 2013-038622 A | 2/2013 |
| WO | 2014-077046 A1 | 5/2014 |
| WO | 2015-014116 A1 | 2/2015 |
| WO | 2017-022179 A1 | 2/2017 |

OTHER PUBLICATIONS

Jun. 6, 2017—International Search Report—Intl App PCT/JP2017/010635.

\* cited by examiner

DISPLAY DEVICE AND DISPLAY CONTROL METHOD

CROSS-REFERENCE TO RELATED APPLICATION

This is a continuation application of International Application No. PCT/JP2017/010635 filed on Mar. 16, 2017, which claims priority from Japanese Patent Application No. 2016-064824 filed on Mar. 29, 2016. The entire disclosure of the prior application is incorporated herein by reference.

BACKGROUND

Technical Field

The present disclosures relate to a display device, such as a head-mounted display, which is configured to display an image, and a display control method using such a display device.

Related Art

Recently, it is carried out that a camera is mounted on a remotely and wirelessly operated mobile object, such as a drone which is a small unmanned airplane, and an image photographed by the camera is displayed in real time on a display placed on the ground. If such a display is provided to an operation controller to operate the mobile object, when the operator is looking at the flying mobile object, he/she cannot view the image displayed on the display, while when he/she is watching the display, he/she cannot look at the mobile object. As above, since the operator cannot visually recognize both the mobile object and the photographed image at the same time, there is a risk that an accident due to operation mistake could occur, or the operator could lose sight of the mobile object.

Regarding a technique to display an image photographed by the camera and external actual scenery at the same time, a transparent type (i.e., see-through type) display device has been conventionally known. For example, conventionally known spectacles having built-in monitor has built-in angular sensor and observation point sensor, and based on a direction of a visual line of observer user detected by the sensors, a direction of the camera by which an image to be displayed on the monitor is photographed is controlled. Further, based on a focal length of an eye of the observer, which is detected by the observation point sensor, a focal point of an electric zoom lens of the camera is also controlled.

Further, for example, an HMD (Head-Mounted Display; Hereinafter, referred to as HMD) configured to switch images from a plurality of cameras provided to surround a vehicle and overlay the same on the external scenery is conventionally known. The HMD is provided with a detection part configured to detect a direction of a driver's head on which the HMD is placed, and a camera photographing a blind area of the vehicle is selected depending on a detection result by the detection part, that is, the direction of the visual line of the driver.

SUMMARY

However, the photographed images from the mobile object, such as a drone, of which position changes constantly may cause an operator' confusion when the mobile object disappears from a viewing filed of the operator. Further, it is impossible to deny a possibility of a risk that, due to a misoperation by the operator, the mobile object may cause an accident, or the mobile object moves to an unexpected place and become out of control.

In consideration of the above situations, aspects of the present disclosures provide, in the display device or the display control method to display an image photographed by the mobile object on the display part, a high-convenience technique which enables the operator to visually recognize the mobile object without being confused by the photographed image, or easily find the mobile object even if he/she loses sight of the mobile object.

According to the present disclosures, a display device, configured to display an image photographed by a camera mounted on a remotely controlled mobile object, includes a display part which is mountable on a head of a user and capable of displaying an image, a receiving part configured to receive a photographed image and position information of the mobile object transmitted from the mobile object, a position detection part configured to detect a position of the display part, a direction detection part configured to detect a direction of the display part, and a controller configured to control image displaying on the display part, determine whether the mobile object exists in the direction of the display part detected by the direction detection part and within a particular range with respect to a position of the display part detected by the position detection part, and switch images to be displayed on the display part depending on whether the mobile object exists within the particular range or not.

Further, according to the present disclosures, a display control method to display an image photographed by a camera mounted on a remotely controlled mobile object on a display part which is mountable on a head of a user includes receiving a photographed image and a position information of the mobile object transmitted from the mobile object using a receiving part, detecting a position of the display part using a position detection part, detecting a direction of the display part using a direction detection part, determining whether the mobile object exists in the direction of the display part detected by the direction detection part and within a particular range with respect to a position of the display part detected by the position detection part, and switching images to be displayed on the display part depending on whether the mobile object exists within the particular range or not.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
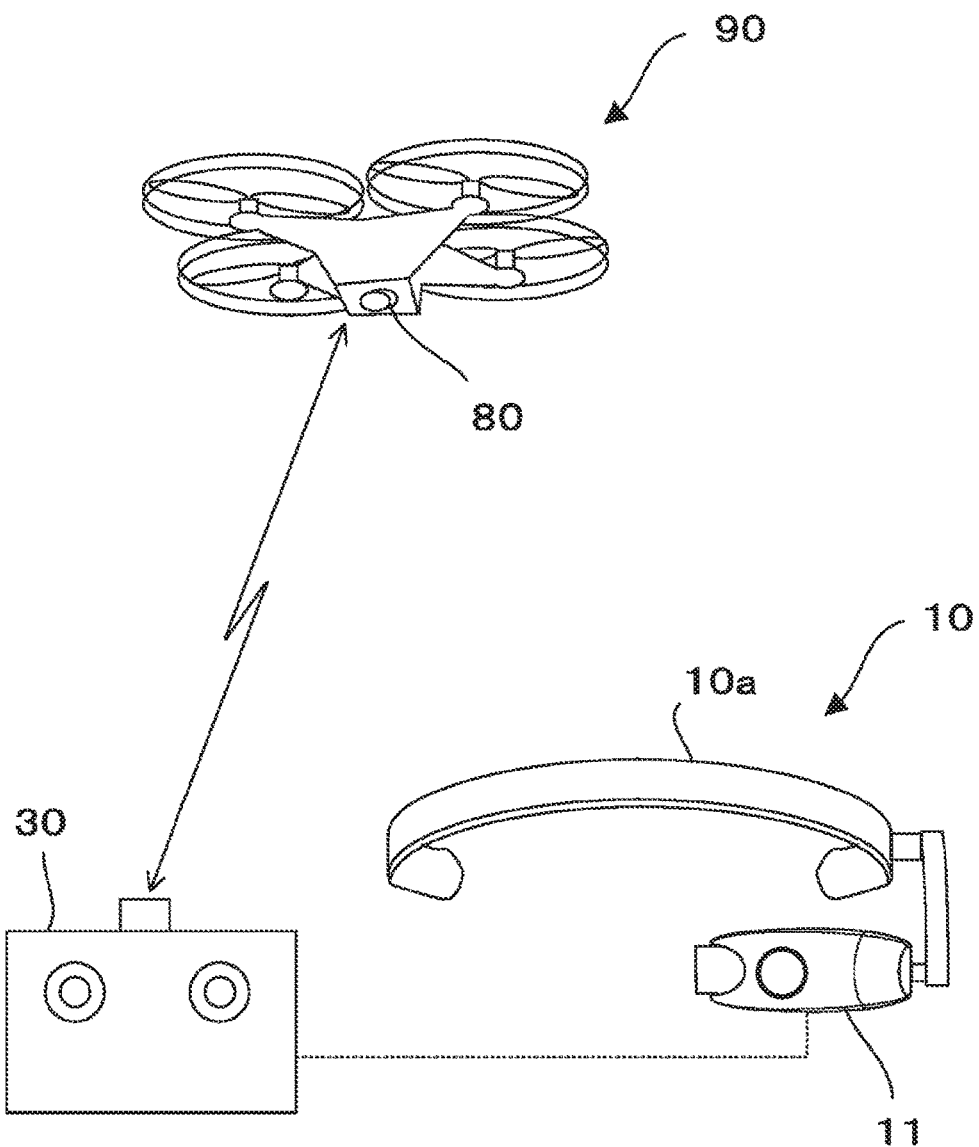
FIG. 1 shows a configuration of an embodiment according to the present disclosures.

FIG. 1 shows an embodiment according to the present disclosures. A display device according the present embodiment is, for example, an HMD 10 provided with a transparent type display part 11. A photographed image of a camera 80 mounted on a drone 90, which is a remotely operable mobile object and is a small unmanned airplane, is displayed on the display part 11. It is noted that the display device according to the present disclosures is not necessarily be limited to the HMD shown in FIG. 1. Further, the display part is not necessarily be of a transparent type as far as an image is displayable. Further, in the description here, the drone which flies in the air is described as an example of the mobile object, but the mobile object could be any remotely controllable arbitrary unmanned aircraft such as a small helicopter or an airship. Further, the mobile object is not necessarily be a flying object, but could be, for example, an unmanned vehicle capable of travelling in a dangerous environment unapproachable by humans, or a working robot provided with a particular underbody mechanism enabling movement in a complicated topography with nibbles or the like. That is, as far as the mobile object is intended to move within a range in which a user wearing the display device can trace the same, the mobile object is not limited to particular models.

In the embodiment shown in FIG. 1, a flying movement of the drone 90 is wirelessly and remotely controlled with use of the operation controller 30. It is noted that a "user" of the HMD 10 indicates a person who wear the HMD 10 comprising the display part 11 on his/her head. Further, according to the embodiment, the user of the HMD 10 himself/herself is also an operator of the drone 90 who operates the operation controller 30 to control the flying movement of the drone 90.

Figure 2:
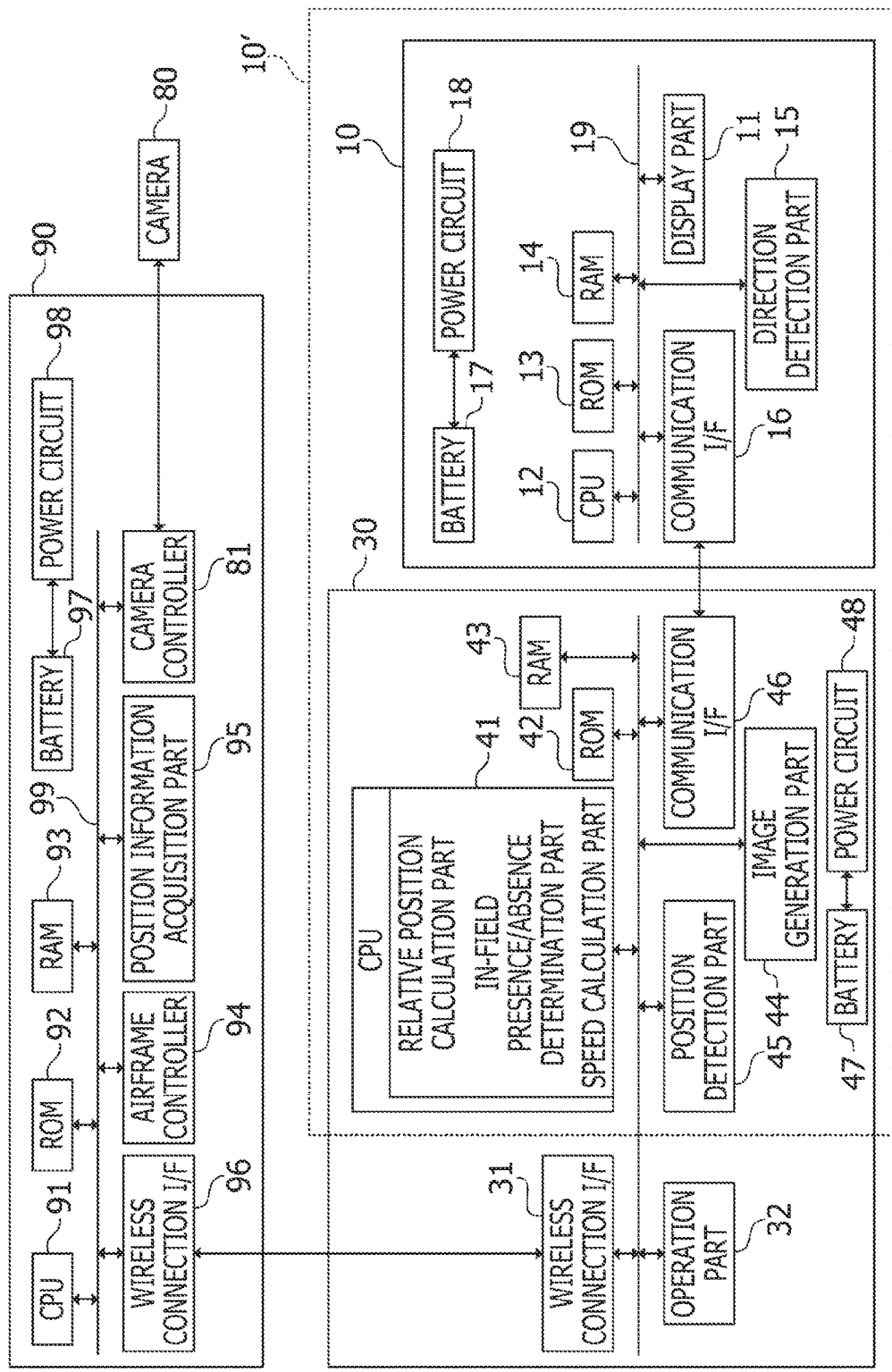
FIG. 2 shows a circuit block diagram including an entire image display system according to the embodiment shown in FIG. 1.

FIG. 2 is a circuit block diagram including the entire image display system according to the present embodiment. Firstly, a configuration of the drone 90 will be described. The drone 90 is configured thereinside with a microcomputer system in which a CPU 91, a ROM 92 and a RAM 93 are connected to an internal bus 99. A control command signal wirelessly transmitted from the operation controller 30 is received by a wireless connection I/F 96. The received control command signal is analyzed by the CPU 91, and an airframe controller 94 controls the flying movement of the drone 90 in accordance with the control command signal.

The drone 90 mounts a GPS (Global Positioning System; hereinafter, referred to as GPS) as a position information acquisition part 95. The position information acquisition part 95 may include, in addition to the GPS, an altimeter and a direction sensor, such as an electronic compass, configured to detect a direction of the drone 90 or the camera 80. The position information acquired by the position information acquisition part 95 may include information on a three-dimensional position of the drone 90 and information on a direction of the drone 90 or the camera 80. The position information of the drone 90 obtained by the position information acquisition part 95 is transmitted to the operation controller 30 through the wireless connection I/F 96.

The camera 80 mounted on the drone 90 is controlled by a camera controller 81. The image data signal of the image photographed by the camera 80 is once stored in an image RAM of the camera controller 81, and transmitted, as needed, to the operation controller 30 through the wireless connection I/F 96.

Further, the camera controller 81 may control an optical system of the camera 80 under control of the CPU 91, or in accordance with a zoom command signal transmitted from the operation controller 30. It is noted that the optical mode of the camera 80 is categorized into a normal mode, a wide-angle mode, and a zoom mode. When it is assumed that the normal mode is a mode in which the lens is controlled to be positioned at a focal position for photographing a particular area, the wide-angle mode is a mode in which the focal position of the lens is controlled to photograph an area wider than the area of the normal mode. Further, the zoom mode is a mode is in which the focal position of the lens is controlled to photograph a narrower area than the area of the normal mode. Further, the camera controller 81 is capable of applying a digital zooming process to the image photographed by the camera 80. In this case, the wide-angle mode in the digital zoom process is a mode to output the image photographed by the camera 80 as it is, and the zoom mode is a mode in which a part of a wide-angle mode image photographed by the camera 80 is cut out, enlarged and output.

In addition to the above, the drone 90 mounts a battery 97 having a power supply capacity necessary for flying movement, and a power circuit 98 sending electric power from the battery 97 to a flying movement driving part, the camera 80 and various controllers.

Next, a configuration of the operation controller 30 will be described. The operation controller 30 is provided with an operation part 32 through which operation information for remotely controlling the drone 90 is input. Concretely, the operation part 32 is configured with various operation switches such as a joystick, depressing buttons and the like, which are provided to a casing of the operation controller 30. Further, the operation controller 30 is provided with a wireless connection I/F 31 which is a transmitting/receiving part to transmit the control command signal corresponding to the operation information input through the operation part 32 to the drone 90, and to receive the position information, the photographed image data and the like from the drone 90.

To the internal bus 49 of the operation controller 30, in addition to a CPU 41, a ROM 42, and a RAM 43, a position detection part 45, an image generation part 44, and a communication I/F 56 for performing data communication with the HMD 10 are connected.

The CPU 41 executes a program stored in the ROM 42 and cooperates, as necessary, with the main elements of the display device such as the ROM 42, the RAM 43, the image generation part 44, the position detection part 45 and the like to function as a display controller of the display device (hereinafter, simply referred to as a display controller). The CPU 41 controls displaying of the photographed image from the camera 80 on the display part 11 of the HMD 10 according to the present disclosures, as well as restricts operation of the drone 90. It is noted that, as the CPU 41 executes a program stored in the ROM 42, operations of a relative position calculation part, an in-field presence/absence determination part, a speed calculation part and the like are realized, which will be described later.

The position detection part 45 is, for example, a GPS, which detects a current position of the operation controller 30. According to the present embodiment, since the user who wears the HMD 10 operates the operation controller 30 to control the drone 90, a distance between the HMD 10 and the operation controller 30 is very short. Accordingly, a position of the operation controller 30 detected by the position detection part 45 can be regarded as the position of the HMD 10 and the display part 11.

The image generation part 44 executes, under control of the CPU 41, processes to generate, edit, and switch display modes with respect to an image to be displayed on the display part 11. Concretely, as will be described later, the image processing part 44 is capable of generating an image for showing a relative position and the direction of the drone 90 on the display part 11, and a particular image to be displayed on the display part 11 when, for example, the user who operates the drone 90 lowers the eyes to see another image. Further, the image generation part 44 is capable of performing the digital zooming process to reconfigure an image by enlarging or reducing the same. The image generation part 44 may be configured to output the generated image data to the display part 11 as the analog or digital video signal. It is noted that the image generation part may be provided inside the HMD 10, and in such a case, the image generation part 44 may be configured to perform, under control of the CPU 41, processes to generate, edit, and switch the display mode (including the digital zooming process to switch between a wide-angle monde and a zoom mode) of an image to be displayed on the display part 11.

The communication I/F 46 is an interface to perform a mutual information-communication with respect to the HMD 10 which is connected by wire or without wire. From the operation controller 30 to the HMD 10, the photograph data photographed by the camera 80 is transmitted. Further, data, picturized by the image generation part 44, based on the mobile object position information transmitted from the drone 90 and the like is transmitted to the HMD 10 through the communication I/F 46. The data includes, for example, numerals, characters, direction/speed/distance markers and the like.

In the meantime, from the HMD 10, direction information detected by a direction detection part 15, which will be described later, is output, which is received by the operation controller 30 through the communication I/F 46.

Besides the above components, the operation controller 30 is provided with a battery 47 and a power circuit 48 configured to supply electrical power necessary for operations of the operation controller 30 to respective circuits.

Next, a configuration of the HMD 10 will be described. In the HMD 10, a microcomputer system in which a CPU 12, a ROM 13, a RAM 15 and a communication I/F 16 are connected to an internal bus 19 is mounted. The internal bus 19 is further connected with the transparent type display part 11. The CPU 12 causes the display part 11 to display an image data signal including a video signal, which is transmitted by the operation controller 30 and received by the communication I/F 16.

The HMD 10 is provided with the direction detection part 15. It is preferable that the direction detection part 15 is built, for example, in a mounting fixture 10a (see FIG. 1) so that the direction of the head of the user who wears the HMD 10 and operates the drone 90 is precisely detected. The direction detection part 15 is preferably a sensor unit which is, for example, a combination of a direction sensor such as an electronic compass and a three-axis acceleration sensor. That is, by detecting the direction in which the HMD 10 is oriented using the direction sensor, to which a gravitational acceleration detected using the three-axis acceleration sensor is added, thereby a three-dimensional direction of the HMD 10 can be detected precisely.

The HMD 10 is further provided with a battery 17 and a power circuit 18 which supply electrical power necessary for a displaying operation of the image to respective circuits and the display part 11.

Figure 3:
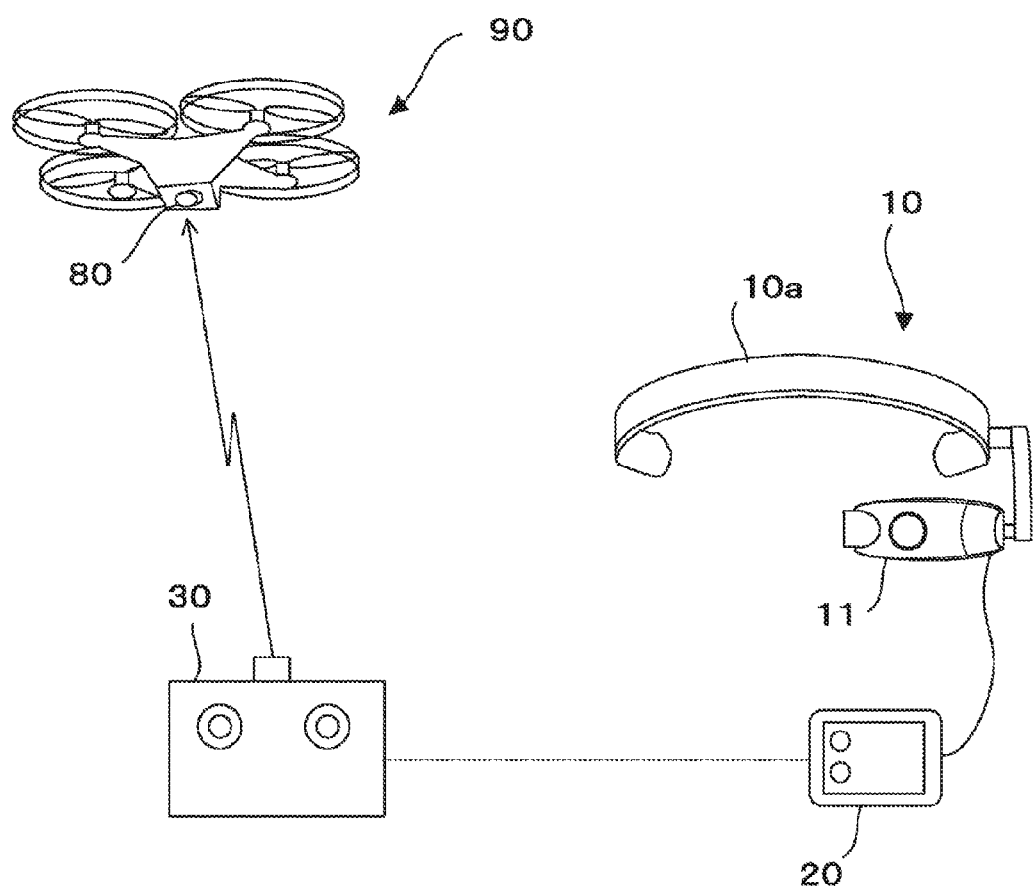
FIG. 3 shows a configuration of another embodiment according to the present disclosures.

In the foregoing description, an embodiment in which the display controller configured to control the HMD 10 to display the images is incorporated in the operation controller 30 of the drone 90 is described. According to another embodiment, all or a part of system elements of the display device surrounded with broken lines 10' in FIG. 2 may be configured to be separated from the operation controller 30. For example, the main elements such as the CPU 41, the ROM 42, the RAM 43, the image generation part 44, the position detection part 45 and the like configuring the display controller may be mounted, for example, on a dedicated CB (control box; hereinafter, referred to as CB) 20 shown in FIG. 3. Further, if the display controller is made into a single chip with use of an ASIC, such a chip may be incorporated in the display part 11 of the HMD 10.

Figure 4:
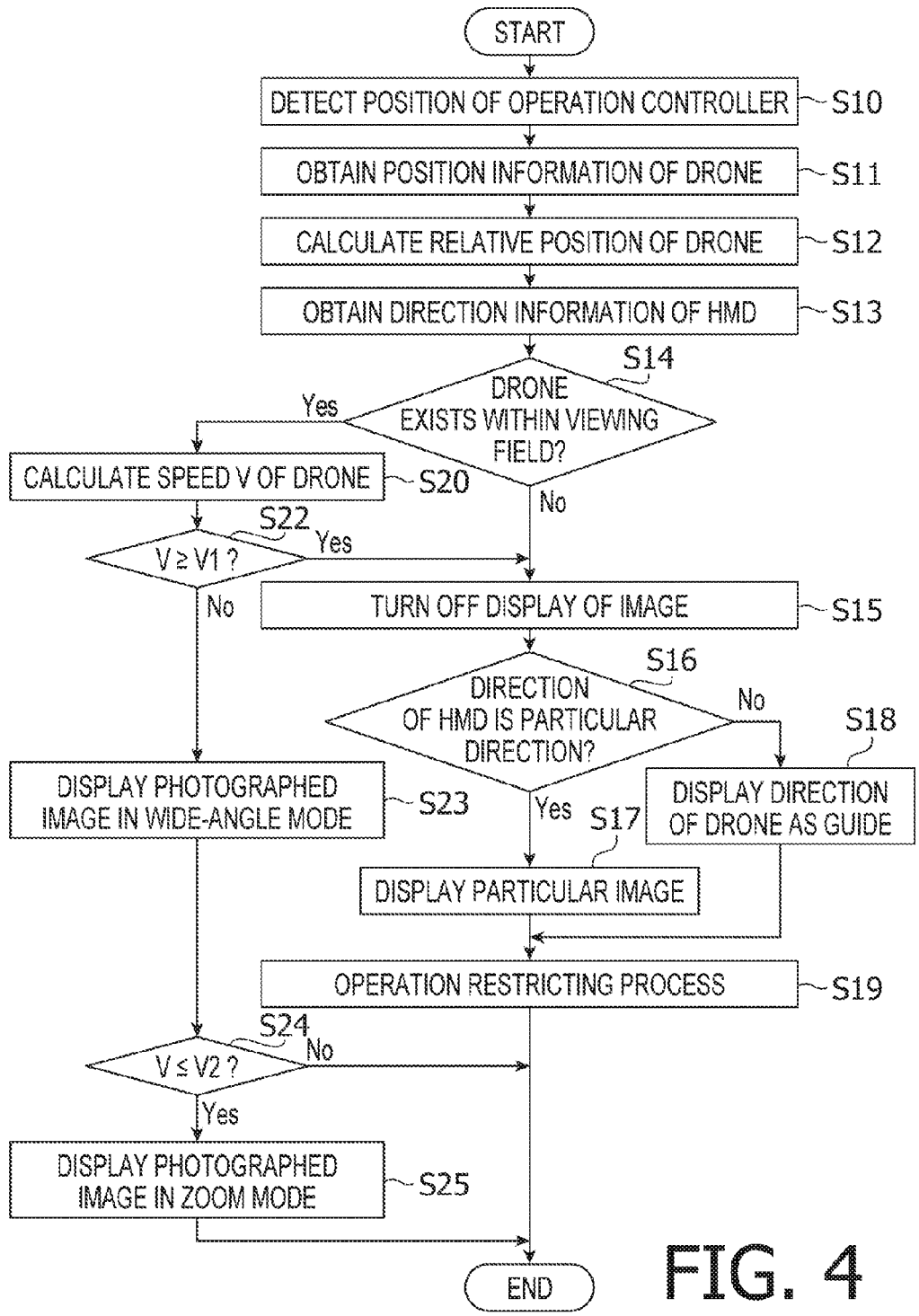
FIG. 4 is a flowchart illustrating a display control method according to an embodiment of the present disclosures.

Next, referring to a flowchart shown in FIG. 4, a display control method by the display controller will be described. It is noted that the display control method described hereinafter is executed as the CPU 41 executes a computation process in accordance with a control program which is stored in the ROM 42 in advance.

The CPU 41 detects a current position of the operation controller 30 using, for example, the GPS which is the position detection part 45 (S10).

Next, the CPU 41 obtains the position information of the drone 90 which is received from the wireless connection I/F 31 (S11).

The relative position calculation part of the CPU 41 calculates the relative position of the drone 90 with respect to the position of the operation controller 30 detected by the position detection part 45 (S12).

The direction detection part 15 of the HMD 10 detects the direction of the HMD 10. The detection value of the direction detection part 15 of the HMD 10 is output to the operation controller 30 as needed. Thus, the CPU 41 of the operation controller 30 obtains direction information of the HMD 10 based on the detection value transmitted from the direction detection part 15 (S13).

The CPU 41 determines whether the drone 90 exists within a particular range on the basis of the position of the HMD 10 based on a relationship between the direction of the HMD 10 obtained based on the detection value of the direction detection part 15 and the relative position of the drone 90 calculated by the relative position calculation part. It is noted that the "particular range" is, for example, a viewing field of the user who wears the HMD 10. In such a case, the range of the viewing field of the user who wears the HMD 10 could be a range within a solid angle which is defined, with the position of the HMD 10 being a base point, by applying a viewing angle of a standard human being (e.g., 120 degrees in an up-down direction, and 200 degrees in a right-left direction).

According to the present embodiment, the in-field presence/absence determination part of the CPU 41 determines whether the drone 90 exits within the viewing field of the user who wears the HMD 10, that is, the user who operates the drone 90 (S14). When the in-field presence/absence determination part determines that the drone 90 does not exist within the viewing filed of the user (S14: NO), the CPU 41 turns off the display of the photographed image from the drone 90 on the display part 11 (S15).

As above, by turning off the display of the photographed image when the drone 90 is out of the viewing field, it is possible to prevent the user who operates the drone 90 from being confused, and misoperation of the drone 90 can also be prevented. Further, the photographed image does not interfere with searching for the drone 90.

Although not shown in the flowchart, at a time point when the drone 90 returns within the viewing field of the user who operates the drone 90, the CPU 41 turns on the display of the photographed image on the display part 11. Further, even within a period during which the drone 90 is out of the viewing field of the user who operates the drone 90, the photographed image may be displayed on the display part 11 when the user performs an operation input to the operation controller 30 or the CB 20 to turn on the display of the image. Since display on the display part 11 is switched depending on whether the drone 90 exists within the particular range or not as described above, it is possible to prevent the user being confused by the unnecessary image displayed on the display part 11 when the user is operating the drone 90.

When the in-field presence/absence determination part determines that the drone 90 does not exist within the viewing field of the user who operates the drone 90, and the direction of the HMD 10 detected by the direction detection part 15 is a particular direction (S16: YES), the CPU 41 switches the image displayed on the display part 11 to the particular image (S17). It is noted that a case where the direction of the HMD 10 is a "particular direction" corresponds, for example, to a cased when the user attempts to see an image other than the drone 90 such as a case where the operator attempts to direct the visual line to the operation controller 30 at hand. In such a case, it is possible to improve convenience to the user by, for example, displaying a particular image such as a help menu, a setting menu, a guidance manual and the like on the display part 11.

Further, when the in-field presence/absence determination part determines that the drone 90 does not exist within the viewing filed of the user who operates the drone 90, the CPU 41 displays, as a guide, information on the direction in which the drone 90 is located based on the direction of the HMD 10 and the relative position of the drone 90 on the display part 11 (S18). A mode of displaying the information on the direction of the drone 90 may include indicating the direction where the drone 90 is located with respect to the current position of the HMD 10 by an arrow, plotting the location of the drone 90 on a simulated radar screen, indicating the relative position of the drone 90 with numerals, characters, markers and the like. Optionally, auxiliary information which can be used to search for the drone 90, such as a distance to the drone 90, a speed of the drone 90 and the like, may be displayed in addition to the information on the direction of the drone 90.

As above, by displaying the information regarding the direction of the drone 90, even if the operator looks away from the drone 90, the drone 90 can be found quickly and easily, and a visual tracking can be restarted.

Optionally, the CPU 41 may restrict the operation of the operation part 32 of the operation controller 30 which is used to remotely control the drone 90 during a period when the drone 90 does not exist within the viewing filed of the user (S19). Further, in such a case, the CPU 41 may issue a control command signal causing the drone 90 to hover and stay at a position where it is to the drone 90.

By providing an operation restriction process as above, it is possible to prevent a situation where the drone 90 causes an accident due to misoperation by the user or the drone 90 becomes uncontrollable as it moves to an unexpected place, when the drone 90 is out of the viewing field of the user.

When the in-field presence/absence determination part determines that the drone 90 exists within the viewing field of the user (S14: YES), a speed calculation part of the CPU 41 calculates a speed V of the drone 90 based on the position information of the drone 90 received from the wireless connection I/F 31 (S20). When the calculated speed V of the drone 90 is equal to or faster than a particular speed V1 (V≥V1) (S22: YES), the CPU 41 turns of the display of the photographed image on the display part 11 (S15).

For example, when the drone 90 is moved at a high speed to a target place, the user remotely controls the drone 90 with carefully watching the same. Therefore, it is unnecessary to display the photographed image on the display 11. Rather, there could be a case where such an image obstruct the operation. According to the present embodiment, by turning off the display of the photographed image when the speed V of the drone 90 is equal to or faster than the particular speed V1, visibility of the user when the drone 90 is visually traced is secured, thereby convenience being improved. It is noted that the speed V of the drone 90 may be of a horizontal component, or a vertical component. Further, the speed V of the drone 90 may be a speed which is a synthesized speed of the horizontal component and the vertical component.

Next, when the speed V of the drone 90 is slower than the particular speed V1 (S22: NO), the CPU 41 switches the display of the photographed image on the display part 11 to the wide-angle mode (S23). In the wide-angle mode, the image data of which size is the photographed size by the camera 80 is output to the display part 11 as it is, thereby the photographed image in a wider area, which is wider than the particular area, being displayed. It is noted that the CPU 41 may transmit a command signal to the drone 90 to control the optical system of the camera 80 to realize the wide-angle mode.

For example, when the drone 90 is moving at a speed which is less than a certain speed, it is likely that the drone 90 is located at around the target place to be photographed. In such a case, by automatically switching to the wide-angle mode, the position of the photographed object can be roughly captured, which improves the convenience to the user.

Further, when the speed V of the drone 90 is equal to or a less than a stop determination speed V2 (V2<<V1) at which it is regarded that the drone 90 is substantially stopped (S24: YES), the CPU 41 switches the display mode of the display part 11 to the zoom mode (S25). In the zoom mode, the CPU 41 extracts a part of the image photographed by the camera 80, and displays an enlarged image of which area is narrower than the particular area on the display part 11. It is noted that the CPU 41 may transmits a command signal to the drone 90 to control the optical system of the camera 80 to realize the zoom mode.

For example, when the speed of the drone 90 is equal to or less than the stop determination speed V2, that is, when the drone 90 is substantially stopped, it is likely that the drone 90 has reached the target place to be photographed. In such a case, by automatically switching to the zoom mode, details of the photographed object can be captured, which improves the convenience to the user.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

What is claimed is:

1. A display device configured to display an image photographed by a camera mounted on a remotely controlled mobile object, comprising:
   a display part which is mountable on a head of a user and capable of displaying an image;
   a receiving part configured to receive a photographed image and position information of the mobile object transmitted from the mobile object;
   a position detection part configured to detect a position of the display part;
   a direction detection part configured to detect a direction of the display part; and
   a controller configured to:
      control image displaying on the display part;
      determine whether the mobile object exists in the direction of the display part detected by the direction detection part and within a particular range with respect to a position of the display part detected by the position detection part; and
      switch images to be displayed on the display part depending on whether the mobile object exists within the particular range or not.

2. The display device according to claim 1,
   wherein, when it is determined that the mobile object does not exist within the particular range, the controller turns off the displaying of the photographed image on the display part.

3. The display device according to claim 1,
   wherein, when it is determined that the mobile object does not exist within the particular range and the direction of the display part is a particular direction, the controller switches the displayed image on the display part to a particular image.

4. The display device according to claim 1,
   wherein, when it is determined that the mobile object does not exist within the particular range, the controller displays information regarding a direction of the mobile object on the display part based on the direction of the display part and a relative position which is a position of the mobile object based on the position information of the mobile object received by the receiving part relative to a position of the display part detected by the position detection part.

5. The display device according to claim 1,
   wherein the controller is further configured to restrict an operation of an operation part to input operation information to remotely control the mobile object when the mobile object does not exist within the particular range.

6. The display device according to claim 1,
   wherein the controller is further configured to calculate a speed of the mobile object based on the position information of the mobile object received by the receiving part,
   wherein, when the speed of the mobile object calculated by the controller is equal to or faster than a particular speed, the controller turns off the displaying of the photographed image on the display part.

7. The display device according to claim 1,
   wherein the controller is further configured to calculate a speed of the mobile object based on the position information of the mobile object received by the receiving part,
   wherein the controller turns on the displaying of the photographed image when there exists the mobile object within the particular range, and switches to a wide-angle mode to display a wider area, which is wider than a particular area, of the photographed image when it is determined that the speed of the mobile object calculated by the controller is slower than a particular speed.

8. The display device according to claim 7,
   wherein, when the speed of the mobile object calculated by the controller is equal to or slower than a stop determination speed which is slower than the particular speed, the controller switches to a zoom mode to display a narrower area, which is narrower than the particular area, of the photographed image.

9. A display control method to display an image photographed by a camera mounted on a remotely controlled mobile object on a display part which is mountable on a head of a user, comprising:
   receiving a photographed image and a position information of the mobile object transmitted from the mobile object using a receiving part;
   detecting a position of the display part using a position detection part;
   detecting a direction of the display part using a direction detection part;
   determining whether the mobile object exists in the direction of the display part detected by the direction detection part and within a particular range with respect to a position of the display part detected by the position detection part; and
   switching images to be displayed on the display part depending on whether the mobile object exists within the particular range or not.

10. The display control method according to claim 9, further comprising:
    when it is determined that the mobile object does not exist within the particular range, turning off the displaying of the photographed image on the display part.

11. The display control method according to claim 9, further comprising:
    when it is determined that the mobile object does not exist within the particular range and the direction of the display part is a particular direction, switching the displayed image on the display part to a particular image.

12. The display control method according to claim 9, further comprising:
    when it is determined that the mobile object does not exist within the particular range, displaying information regarding a direction of the mobile object on the display part based on the direction of the display part and a relative position which is a position of the mobile object based on the position information of the mobile object received by the receiving part relative to a position of the display part detected by the position detection part.

13. The display control method according to claim 9, further comprising:
    restricting an operation of an operation part to input operation information to remotely control the mobile object when the mobile object does not exist within the particular range.

14. The display control method according to claim 9, further comprising:
calculating a speed of the mobile object based on the position information of the mobile object received by the receiving part; and
when the speed of the mobile object as calculated is equal to or faster than a particular speed, turning off the displaying of the photographed image on the display part.

15. The display control method according to claim 9, further comprising:
calculating a speed of the mobile object based on the position information of the mobile object received by the receiving part;
turning on the displaying of the photographed image on the image display part when there exists the mobile object within the particular range; and
switching to a wide-angle mode to display a wider area, which is wider than a particular area, of the photographed image when it is determined that the speed of the mobile object as calculated is slower than the particular speed.

16. The display control method according to claim 15, further comprising:
when the speed of the mobile object as calculated is equal to or slower than a stop determination speed which is slower than the particular speed, switching to a zoom mode to display a narrower area, which is narrower than a particular area, of the photographed image.

* * * * *